Figure 1:
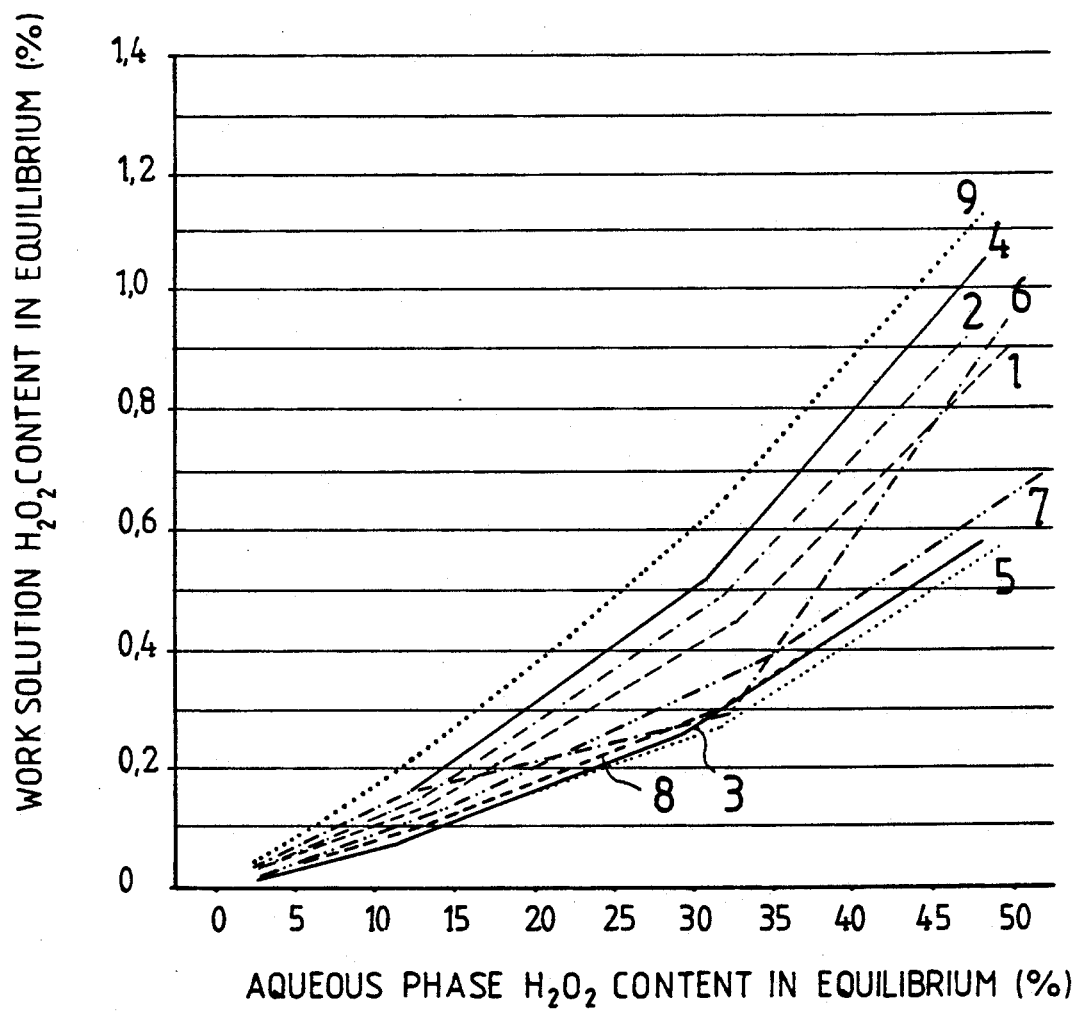

United States Patent [19]

Suokas et al.

[11] Patent Number: 5,114,701
[45] Date of Patent: May 19, 1992

[54] METHOD FOR PRODUCING HYDROGEN PEROXIDE AND SOLVENT SYSTEM FOR USE IN THE HYDROGEN PEROXIDE PRODUCTION PROCESS

[75] Inventors: Elias Suokas, Espoo; Reijo Aksela, Oulu, both of Finland

[73] Assignee: Kemira OY, Helsinki, Finland

[21] Appl. No.: 571,084

[22] Filed: Aug. 22, 1990

[30] Foreign Application Priority Data

Sep. 18, 1989 [FI] Finland .................. 894411

[51] Int. Cl.$^5$ .................................. C01B 15/023
[52] U.S. Cl. ........................ 423/588; 252/182.12; 252/186.43
[58] Field of Search ............. 423/588; 252/182.12

[56] References Cited

U.S. PATENT DOCUMENTS 4,046,868 9/1977 Vaughan ................ 423/588
4,803,063 2/1989 Pralus ..................... 423/588

Primary Examiner—Wayne A. Langel
Attorney, Agent, or Firm—Dressler, Goldsmith, Shore, Sutker & Milnamow, Ltd.

[57] ABSTRACT

The invention concerns a method for producing hydrogen peroxide using a process based on anthraquinone derivatives. According to the invention the solvent system of the working solution in said process contains carbamate having a general formula

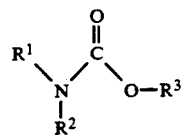

where groups $R^1$ and $R^2$, which can be the same or different ones, are a hydrogen atom or a hydrocarbon group and $R^3$ is a hydrocarbon group, whereby the groups $R^1$, $R^2$ and $R^3$ can optionally be part of a cyclic structure and/or substituted by groups which are inert to the process.

8 Claims, 4 Drawing Sheets

METHOD FOR PRODUCING HYDROGEN PEROXIDE AND SOLVENT SYSTEM FOR USE IN THE HYDROGEN PEROXIDE PRODUCTION PROCESS

The present invention concerns a method for producing hydrogen peroxide by means of a process based on the use of anthraquinone derivatives and, furthermore, a novel solvent system used in the working solution of the process.

Hydrogen peroxide is most generally produced using the so-called anthraquinone method. An anthraquinone derivative is hydrated in the process into the corresponding anthrahydroquinone derivative, which is then oxidized with air or oxygen back to its quinone form and hydrogen peroxide. The hydrogen peroxide is extracted from the organic phase of the working solution into water.

In terms of the process variables it is essential that the solubility of the anthraquinone and anthrahydroquinone derivatives into the working solution is maximally high. In addition, the distribution ratio of hydrogen peroxide between the working solution and the extracting water phase should be advantageous. The components of the working solution should be nonsoluble in water (that is, aqueous hydrogen peroxide) and the residual water content of the working solution should be minimal. The working solution must, of course, be recyclable in the process which brings additional requirements in terms of stability, corrosion characteristics and safety.

In conventional solvent systems it is customary to have an aromatic hydrocarbon solvent for dissolving the anthraquinone components, while another compound of more polar nature is necessary for keeping the anthrahydroquinone components in the solution. The most generally used compounds in the solvent systems include, i.a., secondary alcohols, trialkylphosphates, 2,6-dialkylcyclohexanone, mono- and diacetylbenzophenones and triacetylbenzenes (cf. Kirk-Othmer, Encyclopedia of Chemical Technology, 3rd Ed., Vol. 13, p. 18).

Known from patent publications are also tetraalkylurea compounds (cf. EP 44480, U.S. Pat. No. 3,767,778, SE 418,486), which can also be cyclic compounds (FI patent application 881378).

Furthermore, it is conventional to use amides (cf. U.S. Pat. No. 4,046,868, FR 2,244,709, FI patent application 881775), which can also be cyclic compounds (cf. pyrrolidones in U.S. Pat. No. 4,394,369, caprolactams in FI patent application 881377 and a more generally treatise in SE 8701293-6).

According to the present invention it has been unexpectedly found that the extractibility characteristics of hydrogen peroxide from the working solution in particular can be improved by adding carbamate into an otherwise conventional working solution, whereby the general structure of the carbamate is

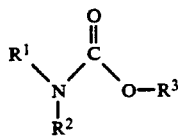

I where groups $R^1$ and $R^2$, which can be the same or different ones, are a hydrogen atom or a hydrocarbon group, and $R^3$ is a hydrocarbon group, whereby the groups $R^1$, $R^2$ and $R^3$ can optionally be part of a cyclic structure and/or substituted by groups which are inert to the process.

In this manner the distribution ratio between water and the working solution can be increased and, additionally, the water content in the working solution remains smaller after the extraction stage.

The principal characteristics of the invention are disclosed in the appended claims.

The character of groups $R^1$, $R^2$ and $R^3$ in formula I can be varied in wide limits. In the terms of the process, a limiting factor is set by the solubility of carbamate into the aqueous phase that increases with a decreasing molecular weight. By increasing its molecular weight, particularly in conjunction with the presence of aromatic groups in the compound, the carbamate can also be used for substituting the aromatic solvent component. The carbamate group can also be a part of a cyclic structure. Groups $R^1 \ldots R^3$ of the general formula I of the carbamate can obviously contain such substituents that are stable in the different stages of the hydrogen peroxide production process, particularly under the stresses imposed by hydration and the presence of hydrogen peroxide in the process conditions.

According to the invention a preferred solvent system of the working solution contains such carbamate according to formula I where $R^1$ and $R^2$ are a hydrogen atom or a linear or branched alkyl group containing 1 ... 20 carbon atoms, and $R^3$ is a linear or branched alkyl group containing 1 ... 20 carbon atoms.

In addition, the solvent system contains one or several conventional components of a solvent system for the working solution of the anthraquinone process such as an aromatic hydrocarbon or phosphated ester.

The content of carbamate according to formula I in the solvent system typically is approx. 5 ... 35% v/v. Large contents of carbamate result in a better distribution ratio than that available by the use of a lower content.

Several methods are known in the art for producing carbamates according to formula I. A preferred method is to allow alkylchloroformate to react with amine, in the presence of a base for neutralizing the hydrochloric acid, according to the following reaction formula:

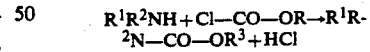

A method suitable for N-monoalkylated carbamates is a base-catalyzed reaction of isocyanates with alcohols:

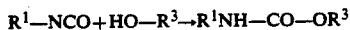

Figure 2:
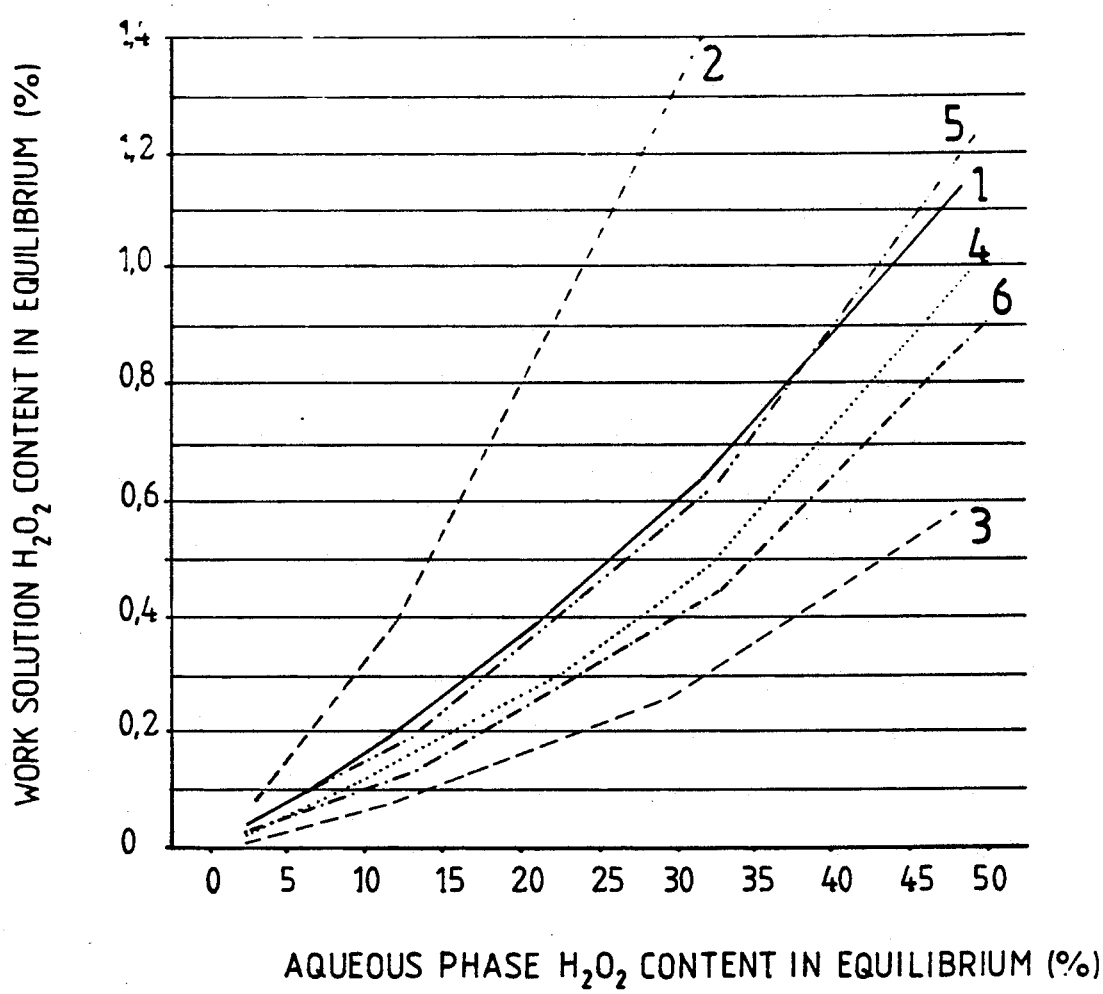
Figure 3:
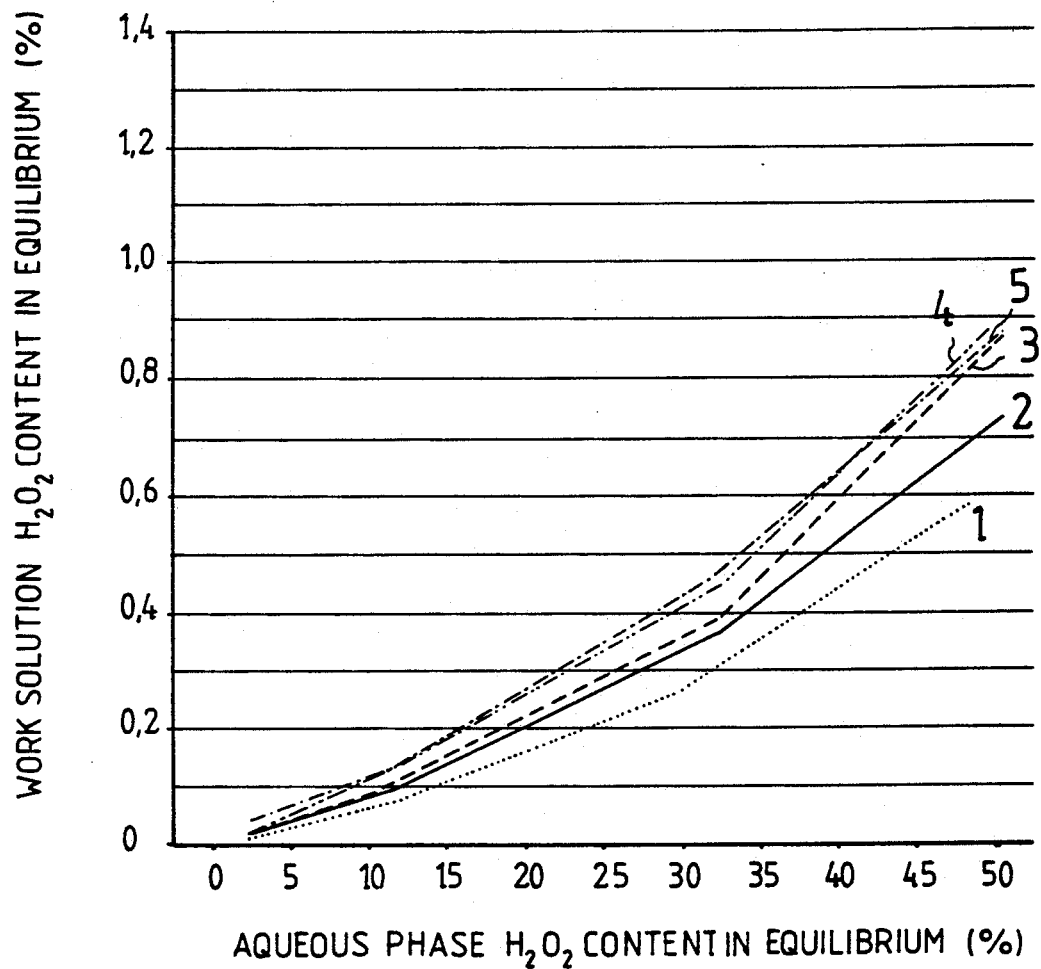
Figure 4:
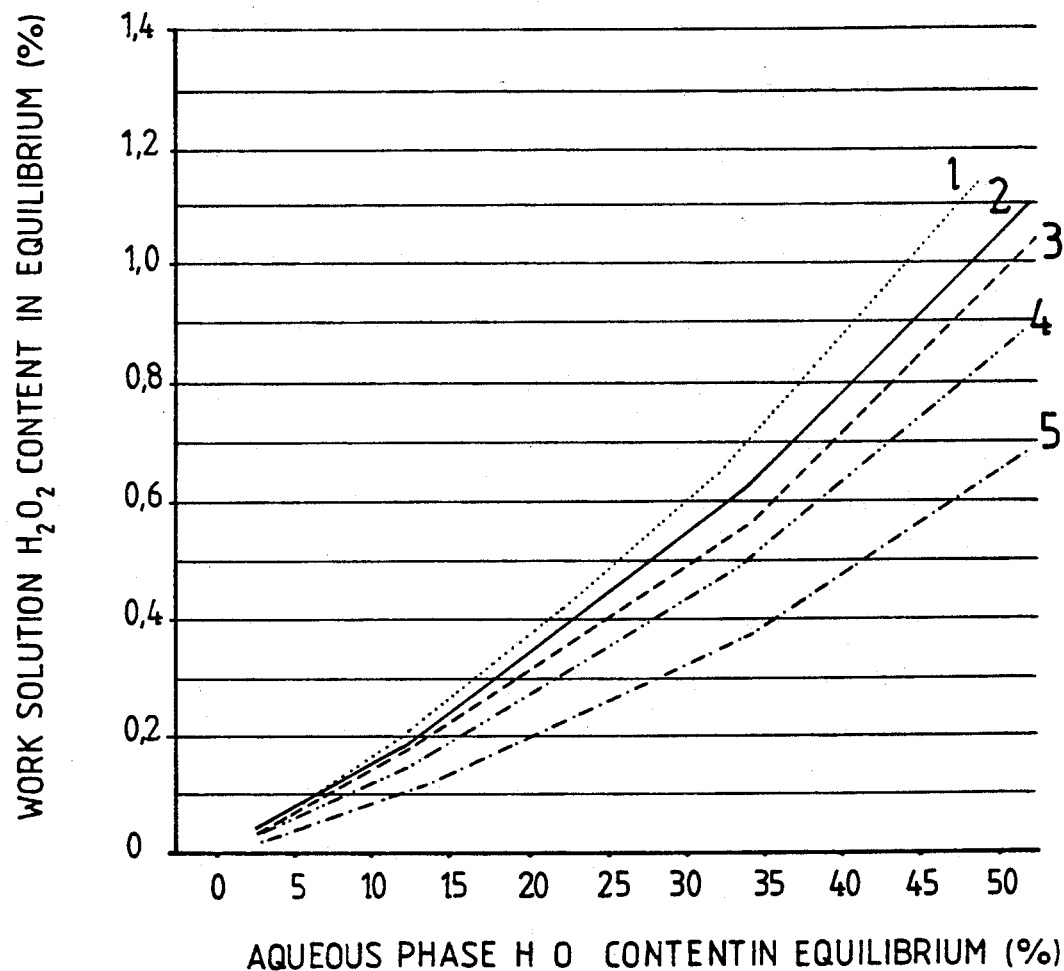

In the following the invention is described in more detail with the help of examples and experiments referencing to the attached drawings in which FIG. 1 shows in a graphic form the effect of different kinds of carbamates used according to the invention on the equilibrium of the extraction, FIG. 2 shows in a graphic form the equilibrium of extraction of certain kinds of carbamates used according to the invention in respect to the equilibrium of conventional solvent systems, FIG. 3 shows in a graphic form the equilibrium curves of extraction for different kinds of solvent system compositions containing carbamates according to the invention, and FIG. 4 shows in a graphic form the equilibrium of extraction as a function of content of a carbamate used according to the invention.

EXAMPLE 1

Preparation of carbamates

Carbamates in accordance with formula I were prepared according to the following general instruction. A reaction vessel equipped with an agitator was filled with $CaCO_3$ (0.125 mol) as an aqueous slurry and amine $R^1NHR^2$ (0.25 mol) dissolved in toluene (65 ml) was added. Alkylchloroformate $R^3$—O—CO—Cl (0.245 mol) was added to the reaction mixture while the temperature of the mixture was kept at 25° C. by cooling. After all chloroformate was added, the reaction mixture was agitated at ambient temperature overnight.

The reaction mixture was next washed with 10% HCl twice and finally with water to remove all chlorides. This method was used to prepare the following compounds:

1. $R^1=R^2=C_5H_{11}$ (amyl), $R^3=C_2H_5$ (ethyl)
2. $R^1=R^2=C_8H_{17}$ (2-ethylhexyl), $R^3=C_2H_5$ (ethyl)
3. $R^1=R^2=C_5H_{11}$ (amyl), $R^3=C_8H_{17}$ (2-ethylhexyl)
4. $R^1=R^2=C_2H_5$ (ethyl), $R^3=C_4H_9$ (butyl)
5. $R^1=H$, $R^2=C_4H_9$ (butyl), $R^3=C_8H_{17}$ (2-ethylhexyl)
6. $R^1=R^2=C_2H_5$ (ethyl), $R^3=C_8H_{17}$ (2-ethylhexyl)
7. $R^1=R^2=C_4H_9$ (butyl), $R^3=C_8H_{17}$ (2-ethylhexyl)
8. $R^1=R^2=C_2H_5$ (butyl), $R^3=C_{14}H_{29}$ (myristyl)

In place of toluene the solvent can be, for instance, Shellsol AB (commercial solvent containing aromatic $C_{10}\ldots C_{11}$ hydrocarbons, b.p. 186°...216° C.), which is an appropriate component in the working solution, thereby obviating the need to separate the carbamate, but instead permitting the solution to be directly used in the preparation of the working solution.

Extraction of hydrogen peroxide from the working solution.

In the hydrogen peroxide process the hydration and oxidation of the anthraquinone derivative is followed by the extraction of the produced hydrogen peroxide into water. The effect of different carbamates on the extraction was studied by determining the extraction equilibrium curves for different compositions of the working solution. The working solutions were prepared by replacing the constituents of conventional working solutions (mostly the polar constituent) by carbamate. The reference solutions used in the studies were known compositions of working solutions. A general study method is described in Example 2.

EXAMPLE 2

Equilibrium curves of extraction

The composition of test working solutions was:
70% Shellsol AB (mixture of aromatic $C_{10}\ldots C_{11}$ hydrocarbons)
5% tris(2-ethylhexyl)phosphate (TOF)
25% carbamate In addition, 2-ethylanthraquinone (EAQ) was dissolved into working solution by 110 g per 1 liter solvent mixture. In some reference solutions different EAQ contents were used.

The working solutions were agitated for 30 minutes at 50° C. with aqueous solutions of hydrogen peroxide. The hydrogen peroxide content was varied in the range 2...50% v/v or w/w. The ratio of liquid phase volumes was 1:1.

Test 1

The working solutions listed in Table 1 below were used, and the obtained equilibrium contents are shown in FIG. 1.

TABLE 1

| Curve no. | Shellsol | TOF | Carbamate 1 | 2 | 3 | 4 | 5 | 6 | 7 | 8 | EAQ g/l | $H_2O$ 1) % |
|---|---|---|---|---|---|---|---|---|---|---|---|---|
| | | | % v/v | | | | | | | | | |
| 1 | 70 | 5 | 25 | | | | | | | | 110 | 0.20–0.22 |
| 2 | 70 | 5 | | 25 | | | | | | | 110 | 0.27–0.31 |
| 3 | 70 | 5 | | | 25 | | | | | | 110 | 0.14–0.17 |
| 4 | 70 | 5 | | | | 25 | | | | | 110 | 0.25–0.27 |
| 5 | 70 | 5 | | | | | 25 | | | | 110 | 0.15–0.19 |
| 6 | 70 | 5 | | | | | | 25 | | | 110 | 0.28–0.32 |
| 7 | 70 | 5 | | | | | | | 25 | | 110 | 0.20–0.26 |
| 8 | 70 | 5 | | | | | | | | 25 | 110 | 0.20–0.21 |
| 9 | 70 | 30 | | | | | | | | | 140–160 | 0.24–0.35 |

1) Moisture content remaining in the working solution

Test 2

The working solutions listed in Table 2 below were used, and the obtained equilibrium contents are shown in FIG. 2.

TABLE 2

| Curve no. | Shellsol | TOF | Okt.2) | TBU3) | Carb. 1 | 3 | EAQ g/l | $H_2O$ 1) % |
|---|---|---|---|---|---|---|---|---|
| | | | % v/v | | | | | |
| 1 | 70 | 30 | | | | | 140–160 | 0.24–0.35 |
| 2 | 50 | | 50 | | | | 100 | 1.18–1.32 |
| 3 | 70 | 5 | | | | 25 | 110 | 0.14–0.17 |
| 4 | 75 | 5 | | 20 | | | 160 | 0.20–0.22 |
| 5 | 70 | | 5 | 25 | | | 110 | 0.24–0.27 |
| 6 | 70 | 5 | | | 25 | | 110 | 0.25–0.28 |

1)Moisture content remaining in the working solution
2)Octanol
3)Tetrabutylurea

As is evident from the curves of FIGS. 1 and 2, the curves obtained by using carbamate are significantly superior to those obtained by using the reference solutions containing phosphate ester or working solutions containing octanol. Even the reference working solutions containing the urea compound fall behind the solutions containing carbamate and the best working solutions based on carbamate are significantly better than the reference solutions.

Values given in Tables 1 and 2 also include the moisture content of the working solution after extraction. As is evident, the moisture content of the carbamate-containing working solutions remains low and, moreover, so that the best carbamate-based solutions 3 and 5 for extraction of hydrogen peroxide also reach the lowest moisture content of the working solution.

The following tests 3 and 4 were performed to examine the dependence of the yield of extraction on the carbamate content of the working solution by varying the ratio of Shellsol AB content to the content of the tris(2-ethylhexyl)phosphate to the content of carbamate.

Test 3

The test variable in this study was the content of carbamate 3. The test working solutions listed in Table 3 were used and the obtained equilibrium curves of extraction are shown in FIG. 3.

TABLE 3

| Curve no. | Shellsol | TOF % v/v | Carb. 3 | EAQ g/l |
|---|---|---|---|---|
| 1 | 70 | 5 | 25 | 110 |
| 2 | 65 | 5 | 30 | 110 |
| 3 | 60 | 5 | 35 | 110 |
| 4 | 70 | 10 | 20 | 110 |
| 5 | 70 | 15 | 15 | 110 |

Test 4

The test variable in this study was the content of carbamate 7. The test working solutions listed in Table 4 were used and the obtained equilibrium curves of extraction are shown in FIG. 4.

TABLE 4

| Curve no. | Shellsol | TOF % v/v | Carb. 7 | EAQ g/l |
|---|---|---|---|---|
| 1 | 70 | 30 | 0 | 140-160 |
| 2 | 70 | 25 | 5 | 110 |
| 3 | 70 | 20 | 10 | 110 |
| 4 | 70 | 15 | 15 | 110 |
| 5 | 70 | 5 | 25 | 110 |

As is evident from the curves shown in FIGS. 3 and 4, the best extraction yield was obtained from a mixture of three solvents having a ratio of hydrocarbon to phosphate to carbamate of 70:5:25, that is, for the highest carbamate content used in the test. The variations at different contents were significant for carbamate 7, while carbamate 3 showed much smaller variations.

We claim:

1. A method for producing hydrogen peroxide by a process utilizing reduction and oxidation of an anthraquinone which comprises carrying out the reduction and the oxidation while the anthraquinone is dissolved in a solvent system containing a carbamate having the general formula:

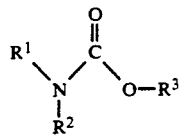

wherein $R^1$ is a hydrogen atom, a hydrocarbon group, or a hydrocarbon group substituted by groups which are inert to the process; $R^2$, which can be identical to or different from $R^1$, is a hydrogen atom, a hydrocarbon group, or a hydrocarbon group substituted by groups which are inert to the process; and $R^3$ is a hydrocarbon group or a hydrocarbon group substituted by groups which are inert to the process;

whereby the groups $R^1$, $R^2$, and $R^3$ can optionally be part of a cyclic structure.

2. A method as claimed in claim 1, wherein the solvent system contains an aromatic hydrocarbon and the carbamate having said general formula where $R^1$ and $R^2$ are selected from the group consisting of a hydrogen atom, and a linear alkyl group containing from 1 to 20 carbon atoms, and a branched alkyl group containing from 1 to 20 carbon atoms, and $R^3$ is a linear or branched alkyl group containing from 1 to 20 carbon atoms.

3. A method as claimed in claim 1, wherein the solvent system contains a component selected from the group consisting of aromatic hydrocarbons, phosphated esters, secondary alcohols, trialkylphosphates, 2,6-dialkylcyclohexanone, acetyl benzophenones, triacetyl benzene, tetraalky urea, amides, and mixtures thereof.

4. A method as claimed in claim 1, wherein the carbamate having said general formula 2-ethylhexyl-N-N-diamylcarbamate or 2-ethylhexyl-N-butylcarbamate.

5. A method as claimed in claim 1, wherein the solvent system contains from 5 to 35 volume percent of the carbamate according to said general formula.

6. A cyclic process for production of hydrogen peroxide comprising:
   (a) alternately reducing and oxidizing a quinone in a solvent system; and
   (b) extracting the hydrogen peroxide formed; wherein the solvent system contains a carbamate having the general formula:

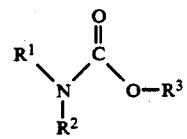

in which $R_1$ is hydrogen or $C_1$ to $C_{20}$ linear alkyl, and $R_2$ and $R_3$ are $C_1$ to $C_{20}$ linear alkyl.

7. The process of claim 6 wherein the carbamate is ethylhexyl-N,N-diamylcarbamate or 2-ethylhexyl-N-N-diamylcarbamate.

8. The process of claim 7 wherein the carbamate is present in said solvent system in an amount of from about 5 to about 35 volume percent of said solvent system.

* * * * *

UNITED STATES PATENT AND TRADEMARK OFFICE
CERTIFICATE OF CORRECTION

PATENT NO. : 5,114,701
DATED : May 19, 1992
INVENTOR(S) : Elias Suokas, et. al.

It is certified that error appears in the above-indentified patent and that said Letters Patent is hereby corrected as shown below:

Column 6, lines 59 and 60, should read as follows:
--2-ethylhexyl-N,N-diamylcarbamate or 2-ethylhexyl-N-butylcarbamate--.

Signed and Sealed this

Seventh Day of September, 1993

Attest:

BRUCE LEHMAN

Attesting Officer  Commissioner of Patents and Trademarks